(12) United States Patent
Schäfer et al.

(10) Patent No.: US 11,450,125 B2
(45) Date of Patent: Sep. 20, 2022

(54) METHODS AND SYSTEMS FOR AUTOMATED TABLE DETECTION WITHIN DOCUMENTS

(71) Applicant: LEVERTON HOLDING LLC, Solon, OH (US)

(72) Inventors: Christian Schäfer, Berlin (DE); Michael Kieweg, Berlin (DE)

(73) Assignee: LEVERTON HOLDING LLC, Solon, OH (US)

( * ) Notice: Subject to any disclaimer, the term of this patent is extended or adjusted under 35 U.S.C. 154(b) by 0 days.

(21) Appl. No.: 16/700,162

(22) Filed: Dec. 2, 2019

(65) Prior Publication Data

US 2020/0175267 A1 Jun. 4, 2020

Related U.S. Application Data

(60) Provisional application No. 62/775,062, filed on Dec. 4, 2018.

(51) Int. Cl.
*G06V 30/412* (2022.01)
*G06K 9/62* (2022.01)
*G06V 30/414* (2022.01)

(52) U.S. Cl.
CPC ......... *G06V 30/412* (2022.01); *G06K 9/6218* (2013.01); *G06K 9/6256* (2013.01); *G06K 9/6262* (2013.01); *G06V 30/414* (2022.01)

(58) Field of Classification Search
CPC .................. G06N 20/00; G06K 2209/01
See application file for complete search history.

(56) References Cited

U.S. PATENT DOCUMENTS

| | | | |
|---|---|---|---|
| 2010/0145678 A1* | 6/2010 | Csomai | G06F 40/268 704/9 |
| 2010/0174975 A1* | 7/2010 | Mansfield | G06F 40/14 715/227 |
| 2015/0093021 A1 | 4/2015 | Xu et al. | |
| 2018/0039907 A1 | 2/2018 | Kraley | |
| 2018/0300315 A1* | 10/2018 | Leal | G06F 40/268 |
| 2018/0322339 A1 | 11/2018 | Cohen et al. | |
| 2018/0336405 A1* | 11/2018 | Messina | G06K 9/4628 |
| 2019/0171704 A1* | 6/2019 | Buisson | G06K 9/00449 |
| 2019/0278837 A1* | 9/2019 | Agrawal | G06N 7/005 |

OTHER PUBLICATIONS

International Search Report and Written Opinion dated Jan. 28, 2020 issued for International PCT Application No. PCT/US2019/063954 filed Dec. 2, 2019.

(Continued)

*Primary Examiner* — Ross Varndell
(74) *Attorney, Agent, or Firm* — K&L Gates LLP

(57) ABSTRACT

Methods and systems for detecting tables within documents are provided. The methods and systems may include receiving a text of the document that includes a plurality of words depicted in the document image. Feature sets may be calculated for the words and may contain one or more features of a corresponding word of the text. Candidate table words may then be identified based on the features vectors, and may then be used to identify a table location within the document image. In some cases, the candidate table words may be identified using a machine learning model.

20 Claims, 5 Drawing Sheets

(56) References Cited

OTHER PUBLICATIONS

Office Action dated Jul. 21, 2022 issued for European patent application No. 19892304.7.
Rashid Sheikh Faisal et al., "Table Recognition in Heterogeneous Documents Using Machine Learning", 2017 14th IAPR International Conference on Document Analysis and Recognition (ICDAR), IEEE, vol. 1, Nov. 9, 2017, pp. 777-782.
Chen F R et al.: "Summarization of Documents without OCR", Computer Vision and Image Understanding, Academic Press, US, vol. 70, No. 3, Jun. 1, 1998, pp. 307-320.

* cited by examiner

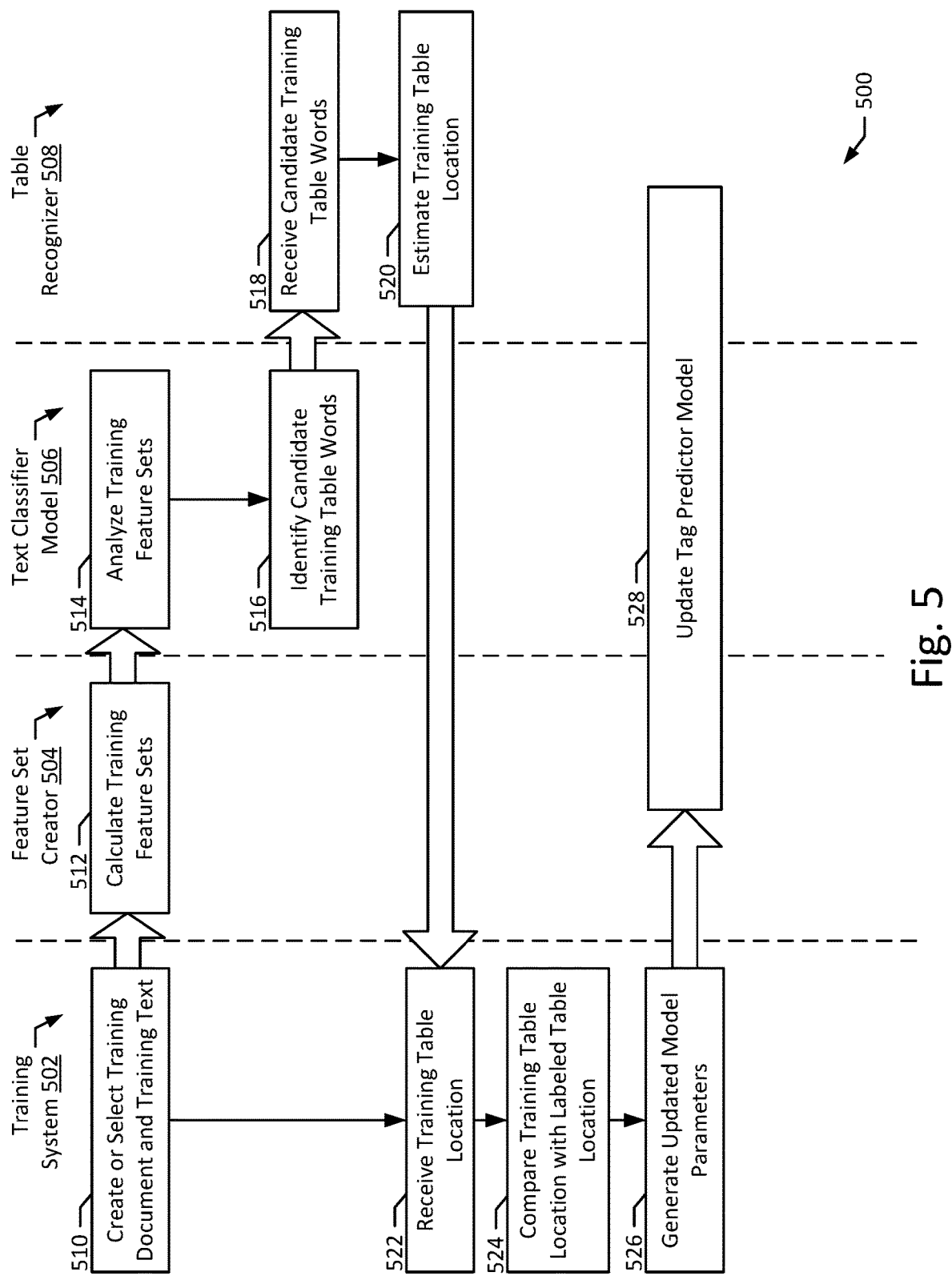

METHODS AND SYSTEMS FOR AUTOMATED TABLE DETECTION WITHIN DOCUMENTS

CROSS-REFERENCE TO RELATED APPLICATIONS

The present application claims priority to U.S. Provisional Patent Application No. 62/775,062 filed on Dec. 4, 2018, the disclosure of which is incorporated herein by reference for all purposes.

BACKGROUND

Many automatic document processing systems scan documents in as document images or store them as a text. These systems may also recognize the text contained within document images using optical character recognition (OCR). By recognizing the text of the document image, the document processing system may be able to perform further analysis. For example, some documents contain information stored within tables that are relevant to understanding the document. Therefore, after recognizing the text of the document image, some document processing systems also attempt to identify tables and table layout information within the document.

SUMMARY

The present disclosure presents new and innovative systems and methods to detect tables within documents. In one example, a method is provided comprising receiving a text of a document image that includes a plurality of words depicted in the document image, calculating a plurality of feature sets for the plurality of words, wherein each feature set contains information indicative of one or more features of a corresponding word of the plurality of words, and identifying candidate table words among the plurality of words based on the feature sets. The method may further includes identifying, with a clustering procedure, a cluster of candidate table words that correspond to a table within the document image and defining a candidate table location including a candidate table border of the table that contains the cluster of candidate table words.

In another example, the candidate table words are identified using a machine learning model. In a further example, the machine learning model is a recurrent neural network or a convolutional neural network.

In yet another example, the features of the feature set include one or both of a text feature and a spatial feature. In a further example, the text feature includes one or more features selected from the group consisting of: orthographic properties of the corresponding word, syntactic properties of the corresponding word, and formatting properties of the corresponding word. In a still further example, the spatial feature includes one or more features selected from the group consisting of: a nearby ruler line distance, a neighbor alignment measurement, and a neighbor distance measurement.

In another example, the candidate table border is defined as the rectangle with the smallest area that contains the cluster of candidate table words. In a still further example, the clustering procedure is a density-based spatial clustering of applications with noise (DBSCAN) procedure. In yet another example, the candidate table border contains one or more words of the text that are not candidate table words.

In a further example, the method further comprises predicting a reading order for at least a subset of the words of the text. In another example, the text further includes a location for the subset of words, and predicting the reading order further comprises assigning a first word of the subset of words as coming before a second word of the subset of words in the reading order if one or more of the following conditions are true: (i) the second word is below the first word according to the location of the first and second words, or (ii) the second word is at the same height as the first word and is positioned to the right of the first word according to the location.

In another example, the method further comprises receiving a training text of a training document, including a plurality of words depicted in the training document and a labeled document image indicating a labeled table location of a table within the training document, calculating a plurality of training feature sets for the words of the training text, wherein each training feature set contains information indicative of one or more features of a corresponding word of the plurality of words of the training text, and identifying, with the machine learning model, candidate training table words of the training text among the words of the training text based on the training feature sets. In yet another example, the method further comprises identifying, with the clustering procedure, a cluster of candidate training table words that correspond to a table within the document image, defining a candidate training table location including a candidate training table border of the training table that contains the cluster of candidate training table words, comparing the training table location with the labeled table location to identify a table location error of the training table location, and updating one or more parameters of the machine learning model based on the table location error.

In a further example, the machine learning model is initially configured to identify table locations in document images from documents of a first document type and updating one or more parameters of the machine learning model enables the machine learning model to identify table locations in document images from documents of a second document type.

In another example, a system is provided comprising a processor and a memory. The memory may contain instructions that, when executed by the processor, cause the processor to receive a text of a document image that includes a plurality of words depicted in the document image, calculate, with a feature set calculator, a plurality of feature sets for the words, wherein each feature set contains information indicative of one or more features of a corresponding word of the plurality of words, and identify, with a text classifier, candidate table words among the plurality of words based on the feature sets. The memory may contain further instructions that, when executed by the processor, cause the processor to identify, with a clustering procedure of a table recognizer, a cluster of candidate table words that correspond to a table within the document image, and define, with the table recognizer, a candidate table location including a candidate table border of the table that includes the cluster of candidate table words.

In another example, the text classifier includes a machine learning model configured to identify the candidate table words. In a further example, the machine learning model is a recurrent neural network or a convolutional neural network.

In a still further example, the features of the feature set include one or both of a text feature and a spatial feature. In yet another example, the text feature includes one or more features selected from the group consisting of: orthographic properties of the corresponding word, syntactic properties of the corresponding word, and formatting properties of the corresponding word. In a further example, the spatial feature includes one or more features selected from the group consisting of: a nearby ruler line distance, a neighbor alignment measurement, and a neighbor distance measurement.

In another example, the candidate table border is defined as the rectangle with the smallest area that contains the cluster of candidate table words. In a further example, the density-based clustering procedure is a density-based spatial clustering of applications with noise (DBSCAN) procedure. In a still further example, the candidate table border contains one or more words of the text that are not candidate table words.

In yet another example, the memory contains further instructions which, when executed by the processor, cause the processor to predict, with a reading order predictor, a reading order for at least a subset of the words of the text. In a further example, the text further includes a location for the subset of words, and the memory contains further instructions which, when executed by the processor, cause the processor to assign, with the reading order predictor, a first word of the subset of words as coming before a second word of the subset of words in the reading order if one or more of the following conditions are true: (i) the second word is below the first word according to the location of the first and second words, or (ii) the second word is at the same height as the first word and is positioned to the right of the first word according to the location.

In a still further example, the system further comprises a training system configured, when executed by the processor, to receive a training text of a training document, including a plurality of words depicted in the training document and a labeled document image indicating a labeled table location of a table within the training document, calculate a plurality of training feature sets for the words of the training text, wherein each training feature set contains one or more features of a corresponding word of the plurality of words of the training text, identify, with the machine learning model, candidate training table words of the training text among the words of the training text, and identify, with the clustering procedure, a cluster of candidate training table words that correspond to a table within the document image. The training system may be further configured, when executed by the processor, to define a candidate training table location including a candidate training table border of the training table that contains the cluster of candidate training table words, compare the training table location with the labeled table location to identify a table location error of the training table location, and update one or more parameters of the machine learning model based on the table location error.

In yet another example, the machine learning model is initially configured to identify table locations in document images from documents of a first document type and updating one or more parameters of the machine learning model enables the machine learning model to identify table locations in document images from documents of a second document type.

In a further example, a computer-readable medium is provided that contains instructions which, when executed by a processor, cause the processor to receive a text of a document image that includes a plurality of words depicted in the document image, calculate, with a feature set calculator, a plurality of feature sets for the words, wherein each feature set contains information indicative of one or more features of a corresponding word of the plurality of words, and identify, with a text classifier, candidate table words among the plurality of words based on the feature sets. The computer-readable medium may also contain instructions which, when executed by a processor, cause the processor to identify, with a clustering procedure of a table recognizer, a cluster of candidate table words that correspond to a table within the document image, and define, with the table recognizer, a candidate table location including a candidate table border of the table that includes the cluster of candidate table words.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE FIGURES

FIG. 5 illustrates a flow diagram of an example method according to an example embodiment of the present disclosure.

DETAILED DESCRIPTION OF EXAMPLE EMBODIMENTS

Figure 1:
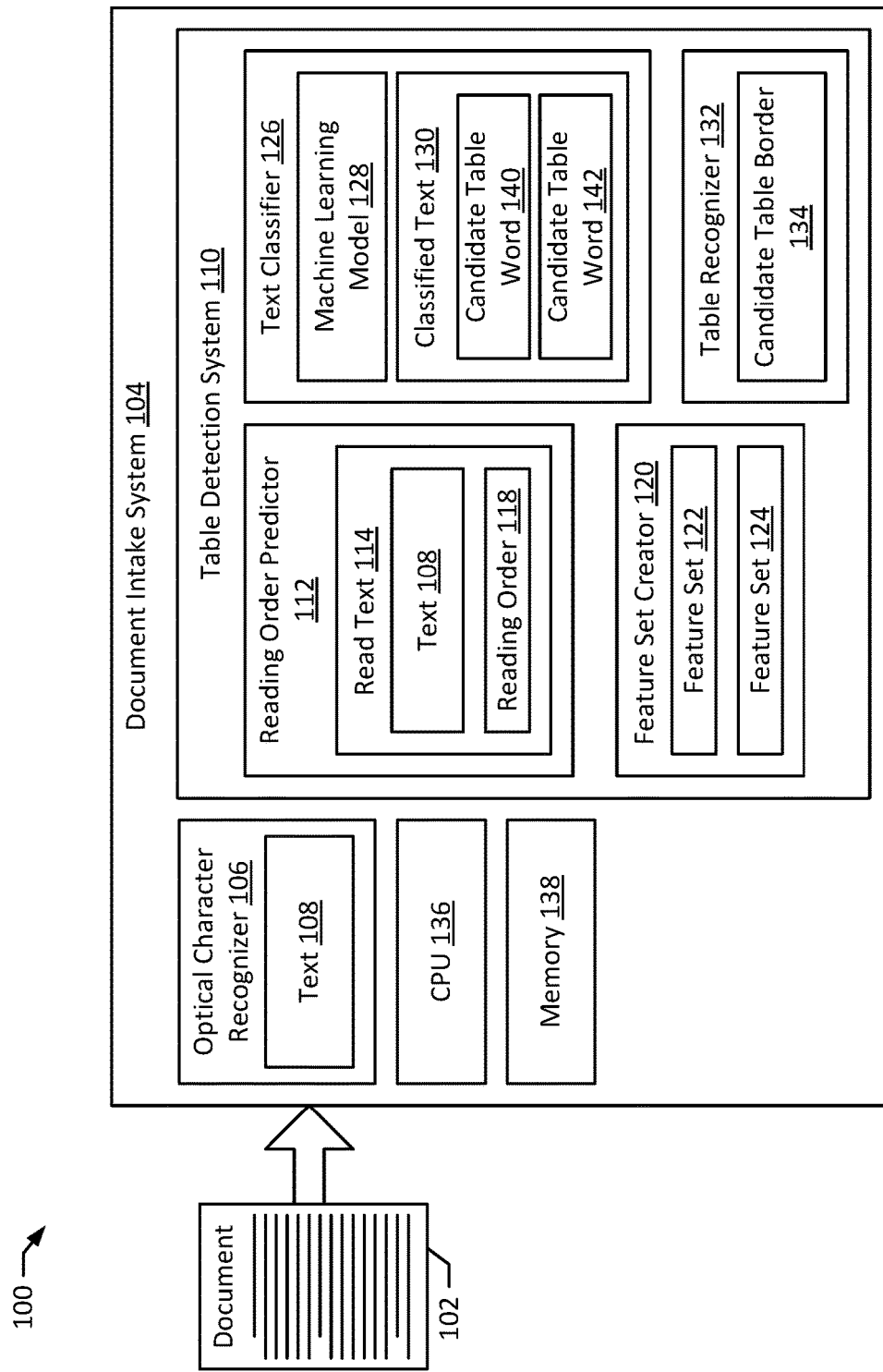
FIG. 1 illustrates a document processing system according to an example embodiment of the present disclosure.

One growing area of automated document processing is the automated analysis of documents, including legal documents. For example, automated tools, such as those from Leverton GmbH, can be used to automatically review large numbers of contracts, leases, title deeds, invoices, and other legal or financial documents during a due diligence process. These documents may include tables, and information within those tables may be important to understanding the content within the documents. Further, other information from the table, such as layout information of the table itself may also be important to understand the documents. To automate the analysis of such documents, an important step is to identify tables within the documents. Examples of such tables may include financial documents with important figures (e.g., invoice amounts, total quantity amounts, order dates). For example, total invoice and quantity amounts may be useful for understanding the content of, e.g., a purchasing order or invoice. In another example, a contract may identify a party or parties to the agreement in a table, such as a table that includes the parties' names and addresses. Properly attributing the provided names, addresses, and contact information to each party may require detecting the table, so that the document processing system can incorporate table layout information (e.g., rows, columns, and row/column labels).

Conventional methods of identifying tables in documents generally rely on heuristics developed and refined over time for specific document types. For example, conventional table detection methods may rely primarily on clustering methods to identify blocks of words that are aligned in a tabular fashion. These methods may then combine multiple blocks of words into tables. However, such heuristic methods often do not work well for difficult and variable table layouts, such as table layouts with inconsistent word alignments. Other difficult table layouts may include complex alignment patterns for rows and columns of the tables, extra offsets for headers and the table, and consistence spacing between rows and columns, and tables with a large proportion of empty cells. Such difficult tables may be found in, e.g., lease contracts, leases amendments, indexation letters, and insurance contracts. Also, tuning these methods is generally very complicated, as each combination of heuristics generally relies on a large set of hyperparameters. Further, because these heuristics are generally developed for particular types of documents, this complexity amplifies the difficulty of tuning these models for new document types. For example, although certain financial documents, such as income statements and cash flow statements, may include similar information, their tabular layouts differ enough that identifying tables within documents of each type may require a separate heuristic. Accordingly, even if a conventional document processing system includes a heuristic for detecting tables within income statements, adding table detection for cash flow statements may require a new heuristic. In this way, developing and improving table detection for document processing systems can quickly become unduly cumbersome.

One innovative procedure, described in the present disclosure, to solve both of these problems, is to receive a text of a document and create feature sets for the words of the text. These feature sets may include one or more features corresponding to words of the text. For example, the feature sets may include text features of a corresponding word or words of the text, such as orthographic properties, syntactic properties, and formatting properties of the corresponding word or words. The feature sets may also include spatial features of the corresponding words of the text, such as a nearby ruler line distance, a neighbor alignment measurement, and a neighbor distance measurement for the corresponding word or words.

A machine learning model may then identify candidate table words within the text based on the feature sets. These candidate table words may be words that the machine learning model has identified as potentially located within a table of the document. For example, candidate table words may be identified when the machine learning model predicts a probability higher than a given threshold that a word is located within a table of the document. In identifying the candidate table words, the machine learning model may analyze one or more of the feature sets for features that indicate the word is likely located within a table. For example, the machine learning model may analyze the feature sets individually. In other implementations, the machine learning model may analyze multiple feature sets for words that are near one another within the document at the same time to better account for relationships and features common between multiple words.

A table may then be identified in the document that includes one or more of the candidate table words. For example, a table may be identified as the rectangle with the smallest area that encloses all of the candidate table words. In another example, the table may be defined as the rectangle with the smallest area that encloses a majority of the candidate table words, or all candidate table words with a certain estimated probability of being in a table. In other implementations, the table words may first be analyzed using clustering procedures to identify one or more clusters of candidate words. In such implementations, the table may be identified similarly to the above-discussed methods. For example, the table may be defined as the rectangle with the smallest area that encloses all of the candidate table words within a given cluster.

Detecting tables in this manner leads to several benefits. First, because the candidate table words are recognized by a machine learning model, rather than heuristics, the method is easier to establish and expand for new document types and new table layouts. Also, because the machine learning model is able to incorporate additional properties, such as text features and spatial features, systems utilizing the above table detection procedures may be more robust across different document types. For example, although income statements and cash flow statements may have different table layouts, the type of text within these tables is often similar (e.g., financial amounts or numerical amounts). Accordingly, a machine learning model that is able to incorporate such text features will be more likely to recognize a table in a new document type even though the table layout differs between documents if the text is similar to text contained in previously identified tables. Additionally, the machine learning model may account for the text's orthographic properties, which current heuristic systems are not capable of doing. This may lead to better recognition of difficult table layouts, such as nontrivial word alignment patterns.

FIG. 1 depicts a document processing system 100 according to an example embodiment of the present disclosure. The document processing system 100 includes a document 102 and a document intake system 104. The document intake system 104 includes an optical character recognizer 106, a table detection system 110, a CPU 136, and a memory 138. The optical character recognizer 106 further includes a text 108. The table detection system 110 includes a reading order predictor 112, a text classifier 126, a feature set creator 120, and a table recognizer 132. The reading order predictor 112 stores a read text 114, which includes the text 108 and a reading order 118. The feature set creator 120 stores feature sets 122, 124. The text classifier 126 includes a machine learning model 128 and stores a classified text 130. The table recognizer 132 includes a candidate table border 134.

The document intake system 104 may be configured to receive a document 102 and recognize the text 108 within the document 102. The document 102 may be stored on the memory 138 after the document 102 is received by the document intake system 104, before the text 108 is recognized. The document 102 may be received from a document server configured to store multiple documents. The document 102 may be a document image, such as a scanned image of a paper document. In some implementations, if the document 102 is a document image, the document intake system 104 may recognize the text 108. In such a case, the document intake system 104 may recognize the text 108 of the document 102 using the optical character recognizer 106. The optical character recognizer 106 may be configured to perform optical character recognition (OCR) on the document 102 to recognize a text 108 of the document 102. In other implementations, the document 102 may already have recognized and/or searchable text (e.g., a word document or a PDF with recognized text). In such a case, the document intake system 104 may recognize the text 108 and may instead continue processing the document 102 in the text 108.

The document 102 may be a document of a particular document type. For example, the document 102 may be a lease agreement, a financial document, an accounting statement, a purchase sale agreement, a title insurance document, a certificate of insurance, a mortgage agreement, a loan agreement, a credit agreement, an employment contract, an invoice, a financial document, and a news article. Although depicted in the singular, in some implementations the document intake system 104 may be configured to receive and process more than one document 102 at a time. For example, the document intake system 104 may be configured to receive multiple documents of the same type (e.g., accounting statements) or maybe configured to receive multiple documents of multiple types (e.g., leases and accounting documents).

The table detection system 110 may be configured to analyze the document 102 and the text 108 to detect tables by identifying candidate table borders 134 indicating the location of the tables within the document 102. For certain documents, or pages within certain documents where common table formatting is involved, the table detection system 110 may utilize conventional methods (e.g., heuristic methods as discussed above) to detect tables within the text 108 in the document 102. For example, when initially processing documents of a new document type, the document intake system 104 may not have sufficient example documents of the new document type required to train the machine learning model 128 of the text classifier 126 to accurately classify the text 108 to create a classified text 130. Therefore, it may be more accurate for the table detection system 110 to rely on conventional methods. But, in other instances where the document 102 contains uncommon formatting, or where it is determined that conventional methods are unsuccessful, the table detection system 110 may instead be configured to predict a reading order 118 with the reading order predictor 112, create feature sets 122, 124 using the feature set creator 120, classify the text 108 to create a classified text 130, and recognize a candidate table border 134 with the table recognizer 132 based on the classified text 130. In other implementations, the table detection system 110 may forego conventional methods and solely use the latter method to detect tables within the text 108 of the document 102. The reading order predictor 112 may be configured to predict a reading order 118 of the text 108. After predicting the reading order 118, the reading order predictor 112 may generate a read text 114 that includes the text 108 and the reading order 118. The read text 114 may be used later in processing, for example by the feature set creator 120 and the text classifier 126. The reading order predictor 112 may be configured with multiple reading order prediction procedures. For example, the reading order predictor 112 may predict the reading order 118 for documents 102 of different document types (e.g., income statements or cash flow statements) with different reading order prediction procedures. In other embodiments, the reading order predictor 112 may use the same reading order prediction procedure for documents of all document types. In certain implementations, the text 108 may also include location coordinates for each word of the text 108 within the document 102. Using these location coordinates, the reading order predictor 112 may predict the reading order 118 by assigning words that are to the right of and/or below a given word as coming later in the reading order 118. For example, the reading order predictor 112 may proceed through each word of the text 108 and may assign each word of the text 108 as coming after the word to its left. When the reading order predictor 112 gets to the end of a line of the text 108, it may proceed to the next line, and may assign the first word of the next line as coming after the last word of the preceding line within the reading order 118. In certain implementations, the optical character recognizer 106 may determine a reading order 118 accurate enough for use by the table detection system 110. In such instances, the reading order predictor 112 may not be necessary and/or may use the reading order 118 identified by the optical character recognizer 106.

The feature set creator 120 may be configured to create feature sets 122, 124. The feature sets 122, 124 may each correspond to one or more words from the text 108. For example, the feature sets 122, 124 may correspond to an individual word from the text 108. In creating the feature sets 122, 124, the feature set creator 120 may receive the text 108 and/or the read text 114. The feature set creator 120 may then process the words of the text 108 to calculate one or more text features and spatial features. For example, the feature set creator 120 may calculate text features such as orthographic properties, syntactic properties, and formatting properties of the corresponding text. The feature set creator 120 may also calculate spatial features such as a nearby ruler distance, a nearby neighbor alignment measurement, and a neighbor distance measurement. These features are discussed in greater detail below in connection with FIGS. 2A and 2B. In certain implementations, where the feature set creator 120 receives the read text 114, the feature set creator 120 may utilize the reading order 118 in calculating the feature sets 122, 124. For example, the feature set creator 120 may use the reading order 118 to identify nearby words within the text 108, and may incorporate aspects of the nearby words in calculating a feature set 122, 124.

The text classifier 126 may be configured to analyze the text 108 and the feature sets 122, 124 to create a classified text 130 that identifies candidate table words 140, 142 within the text 108. In certain implementations, the text classifier 126 may receive the read text 114 and may utilize both the text 108 and the reading order 118 in creating the classified text 130. For example, if a particular word is identified as a candidate table word 140, 142, nearby words in the reading order 118 may also be likely candidate table words. Accordingly, the text classifier 126 may take this information into account.

The text classifier 126 may be configured to use a machine learning model 128 to analyze the feature sets 122, 124 to classify words of the text 108 to identify candidate table words 140, 142. In doing so, the text classifier 126 may create a classified text 130 containing the candidate table words 140, 142. The machine learning model 128 may include, e.g., a convolutional neural network and/or a recurrent neural network. For example, because the machine learning model 128 may be analyzing a series of words within the text 108 in order to create the classified text 130, recurrent neural networks may be preferable. However, in other implementations it may be advantageous to combine both convolutional and recurrent networks (e.g., to better incorporate spatial information). The classified text 130 may include each word from the text 108 of the document 102, or may only include words surrounding or near candidate table words 140, 142. Limiting the classified text 130 to classifying such words may improve performance of the table detection system 110, but including all of the words of the text 108 to create the classified text 130 may enable greater accuracy (e.g., when there are multiple tables for detection within the document 102, or on a single page of the document 102). The candidate table words 140, 142 may include an indication of an estimated probability that the candidate table word 140, 142 is included within a table of the document 102. For example, the machine learning model 128 may generate an estimated probability that each word within the classified text 130 is included within a table of the document 102, and the candidate table word 140, 142 may store that estimated probability. In other implementations, the candidate table words 140, 142 may store only an indication that the word is likely located within a table of the document 102. For example, if the machine learning model 128 estimates a probability above a certain threshold (e.g., 50%, 75%) that a word is included within a table of the document 102, that word may be classified as a candidate table word 140, 142 and may be stored with an indication that the word is a candidate table word 140, 142 within the classified text 130. Similarly, the indication stored within the classified text 130 may also include the above-described estimated probability. Further, the estimated probability may include that estimation that the candidate table word is one or more of a table word, a table header, or a non-table word. For example, the classified text 130 may include an estimation that each word within the text 108 is a table word, a table header, or a non-table word. The classified text 130 may store a separate estimation for each of these 3 categories for all of the words of the text 108, and these estimations may sum to 100%.

The table recognizer 132 may be configured to analyze the classified text 130 to identify one or more candidate table borders 134 of tables contained within the document 102. In certain implementations, the table recognizer 132 may analyze each word of the classified text 130 to identify clusters of candidate table words 140, 142 within the classified text 130 and/or the text 108. The clusters of candidate table words 140, 142 may be identified using one or more clustering methods, such as density-based clustering methods, model-based clustering methods, fuzzy clustering methods, hierarchical clustering methods, and partitioning clustering methods. For example, the clusters of candidate table words 140, 142 may be identified using one or more of the following clustering methods: density-based spatial clustering of applications with noise (DBSCAN), balanced iterative reducing and clustering using hierarchies (BIRCH), clustering using representatives (CURE), hierarchical clustering, k-means clustering, expectation-maximization (EM), ordering points to identify the clustering structure (OPTICS), and mean-shift analysis. In certain implementations, the DBSCAN method may be preferred, as the DBSCAN method does not require cluster number pre-specification, is robust against outlier (i.e., false positive) candidate table word identification, and can find arbitrarily shaped or sized clusters, which may be tuned by specifying a minimum number of candidate table words to be included within each cluster. Once the cluster or clusters are identified, the table recognizer 132 may then calculate a candidate table border 134 identifying an estimated location of a table within the document 102. In certain implementations, the candidate table border 134 may be defined as the smallest rectangular border that contains all of the candidate table words 140, 142 within a given cluster. In this way, the table recognizer 132 may identify a separate table for each cluster of candidate table words 140, 142. In other implementations, such as for document types that rarely include more than one table on a page, the candidate table border 134 may be defined as the smallest rectangular border that encloses all of the candidate table words 140, 142 and clusters of candidate table words 140, 142 on a given page of the document 102. In still further implementations, the table recognizer 132 may utilize one or more heuristics to split and/or merge multiple clusters into a single cluster (e.g., representing a single table). For example, the table recognizer 132 may expand the candidate table border 134 to include one or more additional words of the text 108 located near the smallest rectangular border discussed above. Estimating the candidate table border 134 according to such heuristics may enable the table recognizer 132 to better correct and account for incorrectly classified words of the classified text 130 and to better account for errors (e.g., training areas of the machine learning model 128. Similarly, the clusters may be refined to include words of the text 108 whose location (e.g., boundary backs) are near or overlaps with the border of a cluster.

In certain implementations, the document 102 may include more than one page. For example, if the document 102 is a document image, the document 102 may include multiple images of the pages of the document 102. In such implementations, the document intake system 104 may analyze each page image individually. In other implementations, the document intake system 104 may analyze multiple pages of the document at the same time. In such implementations, for example, if the machine learning model 128 is implemented as a recurrent neural network, each of the multiple pages may be analyzed individually (e.g., in sequence). Alternatively, if the machine learning model 128 is implemented as a convolutional neural network (e.g., a spatial convolutional network), multiple pages may be analyzed by appending the images of each page to be analyzed together into a single image for analysis.

The CPU 136 and the memory 138 may implement one or more of the document intake system 104 features, such as the optical character recognizer 106, the table detection system 110, including the reading order predictor 112, the feature set creator 120, the text classifier 126, and the table recognizer 132. For example, the memory 138 may contain instructions which, when executed by the CPU 136 may perform one or more of the operational features of the document intake system 104.

Figures 2A, 2B:
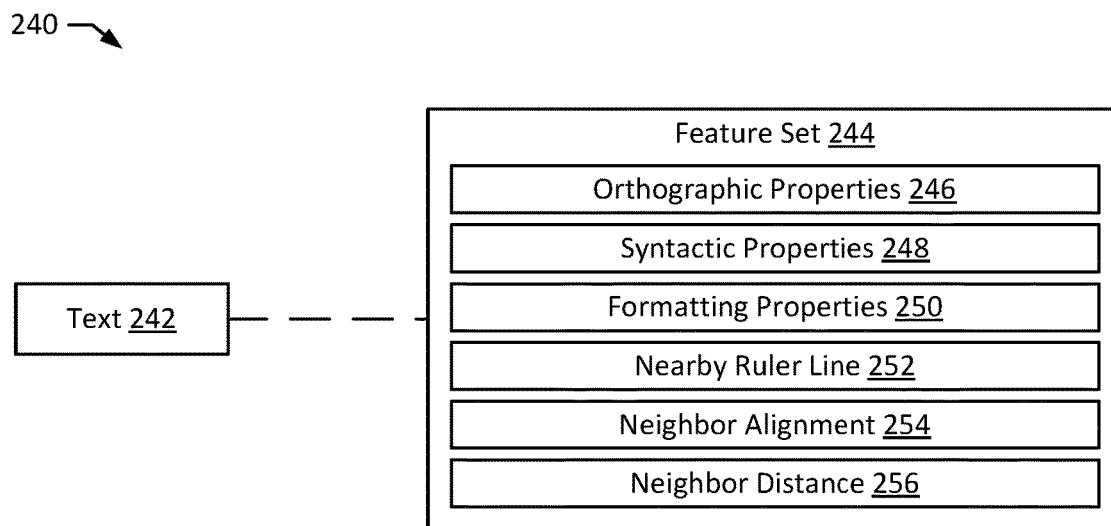
FIG. 2A illustrates a table feature description according to an exemplary embodiment of the present disclosure.
FIG. 2B illustrates an example feature set-text association according to an exemplary embodiment of the present disclosure.

FIG. 2A depicts a table feature description 200 according to an exemplary embodiment of the present disclosure. The description 200 includes a table 202 containing a plurality of rows and columns. The table 202 includes four rows, with the first row identifying the information stored in each column (i.e., column headers). Namely, the first column corresponds to a date of the entry, the second column corresponds to an amount (i.e., a dollar amount) for the entry, and the third column corresponds to the total quantity. The table 202 may be an example of an order form invoice, or other summary of purchases between two parties, with the quantity column indicating the total quantity of goods purchased on the date and the amount indicating the total cost of the goods ordered on that date. The table 202 includes multiple ruler lines separating the rows and columns of the table 202. As depicted, ruler lines 216, 218 separate the columns of the table 202, and the ruler lines 212, 214 separate the rows. Additional ruler lines are depicted in the table 202, but are not identified with reference numbers to reduce complexity. The features identified in the example 200 are depicted relative to the word 204 corresponding to "$145" in the amount column (i.e., the amount entry for the third row of the table 202. The features themselves will be discussed in greater detail below.

FIG. 2B depicts an example feature set-text association 240 according to an exemplary embodiment of the present disclosure. The association 240 includes a text 242 and a feature set 244 associated with the text 242. The text 242 may include one or more words within a text 108 of a document 102. For example, the association 240 may be an example of the association between the feature set 122, 124 and a word from the text 108 and/or the read text 114. The association 240 may also indicate that the feature set 244 was created, at least in part, from features derived from the text line image 302.

As mentioned above, the feature set 244 may be configured to store text features and spatial features of the corresponding text 242. These features may be features solely of the text 242, or may also include feature information of words near the text 242 (e.g., features of the text 242 as compared to similar features of nearby words and document features). As depicted, the feature set 244 includes text features such as orthographic properties 246, syntactic properties 248, and formatting properties 250. The feature set 244 as depicted also includes spatial features such as a nearby ruler line feature 252, neighbor alignment 254, and neighbor distance 256.

The orthographic properties 246 may include specific identifiers indicating whether the corresponding text 242 contains certain orthographic features. For example, the orthographic properties 246 may include numbers, symbols (e.g., financial, legal, scientific, or engineering symbols), camel case letters, capitalized words, words with all capitalized letters, and words with all lowercase letters. In certain implementations, the orthographic properties 246 may be stored as a one-hot encoded vector. For example, the orthographic properties 246 may be configured as a vector whose dimension is the same as the number of orthographic features being identified, where each position within the vector corresponds to a particular orthographic feature at issue. In such an example, a particular orthographic feature may be identified within the vector as a "1" in the corresponding position, with "0" values stored at the position corresponding to the other orthographic features that are not present. The orthographic properties 246 may be directly calculated from a string or vector of the text 242. In certain implementations, or for certain documents types, certain orthographic features may indicate a greater likelihood that the word is contained within a table 202 of the document 102. For example, numbers, especially numbers preceded by a financial symbol such as "$," may be more likely to occur within a table 202 for particular document types (e.g., financial documents). Thus, orthographic properties 246 calculated for text 242 from financial documents may likely include an indication of whether the text 242 is a number, or is a financial symbol such as "$." The orthographic properties 246 of the word 204 may indicate that the word 204 contains only numerals, which may suggest its presence within a table 202. Similarly, the orthographic properties 246 may indicate that the word 204 includes a financial symbol (i.e., "$"), which may also suggest its presence within a table 202.

The syntactic properties 248 may include an indication of typical usage or associated words of the corresponding text 242. For example, the syntactic properties 248 may include an embedding vector, i.e., a word-to-vector representation of a word or words of the corresponding text 242. The embedding vector may include information regarding the semantics of the text, e.g., similar words, commonly associated words, relevant subject areas, word origins. The embedding vector may be provided by a third party and may be stored in a memory 138. The information contained in the embedding vector may assist the text classifier 126 or the machine learning model 128 in classifying the words of the text 108 as candidate table words 140, 142. For example, certain words may be common in headings for tables in specific documents or document types (e.g., "table," "date," "revenue," "amount," "total"). The syntactic properties 248 of these words may indicate that these words are commonly used as headings for such tables. Similarly, certain words may be common within cells of tables in certain documents or document types (e.g., product names, contact information, accounting terms, financial statement items). The syntactic properties 248 of these words may likewise indicate that these words are commonly used within tables. The syntactic properties 248 of the text 204 may indicate that "$145" is a dollar amount, although in certain implementations syntactic properties 248 may not be available or useful for strictly numeric portions of a text 108.

The formatting properties 250 may indicate whether certain specified types of formatting are applied to the corresponding text 242. In instances where the corresponding text 242 includes only one word, the formatting properties 250 may indicate the formatting of that word. In other embodiments where the corresponding text 242 includes multiple words, the formatting properties 250 may include formatting applied to a subset of those words (e.g., applied to any word or a majority of the words of the corresponding text 242) or may include formatting common to all of the words of the corresponding text 242. Applied formatting included within the formatting properties 250 may include whether the text 242 is bolded, italicized, underlined, or struck through. The formatting properties 250 may also include font sizes and fonts of the corresponding text 242. The formatting properties 250 may be stored as a one-hot encoded vector, similar to the discussion above in connection with the orthographic properties 246. For example, the one-hot encoded vector may include the formatting features specified for identification, and may include a "1" for formatting features present within the corresponding text 242 and a "0" for those features that are not included in the corresponding text 242. In certain implementations, or for certain document types, certain formatting properties 250 may indicate a greater likelihood that the corresponding text 242 is included within a table 202. For example, bolded, italicized, or underlined formatting may be more likely to be used for heading text of a table 202, and may therefore suggest that a word is included within a table 202. Similarly, a larger font size relative to text below the corresponding text may also indicate that the word is used as a header in a table 202. Analogously, text smaller than text used throughout a document 102 may indicate that the corresponding words are located within a table 202.

Although not depicted, the features may also include a document type of the document 102, which may be one-hot encoded in each feature set 244, similar to the one-hot encoding discussed above in connection with the orthographic and properties 246, 250. Additionally, the features may include confirmed candidate table word information for words that have already been identified as candidate table words within the document 102. Confirmed candidate table word information may assist the machine learning model 128 with identifying new candidate table words, as candidate table words likely cluster together to form a table within the document 102 in some implementations.

The nearby ruler line feature 252 may include an indication of the presence of ruler lines within the document 102 near the corresponding text 242. For example, the presence of ruler lines may be encoded as a four-dimensional vector within the feature set 244, where each dimension includes a Boolean that corresponds to one direction (i.e., up, down, left, or right) and encodes whether a ruler line is nearby (e.g., within a certain distance of the corresponding text 242) in the given direction. As another example, if the layout information is stored as a 4-dimensional vector, with entries in the vector corresponding to the directions (left, right, up, down), a line below the corresponding text 242 may be encoded as (0,0,0,1). In certain document types, (e.g., an invoice) ruler lines in one or more directions may indicate a greater likelihood that the corresponding text 242 is part of a table 202, with more nearby ruler lines indicating an increased likelihood that the corresponding text 242 is part of a table 202. The nearby ruler line feature 252 for the word 204 may indicate that there are ruler lines 212, 214, 216, 218 nearby and above, below, to the left of, and to the right of the word 204, respectively. In implementations where the nearby ruler line feature 252 is implemented as a one-hot encoded vector, that vector may be represented as (1, 1, 1, 1). Given that there are nearby ruler lines in all four directions, the nearby ruler line feature 252 may provide a strong indication that the word 204 is included within a table 202 of the document 102. In another implementation, rather than a one-hot encoded vector, the nearby ruler lines feature 252 may be implemented as a vector indicating the distance to the nearest ruler line in each direction. For example, a vector represented as (15, 0, 0, 0) may indicate that there is a ruler line 15 pixels above the word 204. In another implementation, the vector may be normalized by a fixed value (e.g., normalized by 100 pixels). In such implementations, the previously-discussed vector may alternatively be represented as (0.15, 0, 0, 0).

The neighbor alignment 254 may include an indication of the alignment of the corresponding text 242 relative to its neighbors. For example, the neighbor alignment 254 of the word 204 may indicate that the word 204 is center aligned along the center axis 210 relative to its neighbors (e.g., "Amount," "$100," and "$250"). In this example, the neighbor alignment 254 is measured relative to a center alignment along the center axis 210, but other alignment measurements are possible, such as left alignment (e.g., along the left axis 206) or right alignment (e.g., along the right axis 208). Different alignment measurements may be useful for tables in different document types, or within different columns of single tables. For example, in certain document types, numbers may typically be center-aligned with one another, but text entries may be left-aligned. Accordingly, neighbor alignment 254 may include measurements along all three axes in order to best account for differing information types within a single table 202. The neighbor alignment 254 for the word 204 may show a strong center alignment between the word 204 and its neighbors, which may provide a strong indication that the word 204 is included within a table 202.

The neighbor distance 256 may include a comparison of the distance between the corresponding text 242 and text neighboring the corresponding text 242, as compared to the median distance between neighboring words within the document 102. The neighbor distance 256 may compare the horizontal distance between horizontal neighbors, and may also or alternatively compare the vertical distance between vertical neighbors. For example, the word 204 has two neighboring distances 222, 228, depicted relative to the two horizontal neighbors "9/29/2017" and "15." For certain documents or document types, a neighbor distance 256 larger than the median neighboring distance within the document 102 may indicate that the corresponding text 242 is likely contained within a table 202. This may be true of both horizontal and vertical neighboring distances.

In some implementations, the feature set 244 may be created by a feature set creator 120. In creating the feature set 244, the feature set creator 120 may analyze the corresponding text 242 to ascertain the features. The feature sets 122, 124, 244 may be stored as a one-dimensional array of floats, where each entry in the array corresponds to a feature of the feature set 244. The feature set creator 120 may interact with external systems, such as an embedding vector provider, to gather features associated with the feature set 244. The feature set creator 120 may also create multiple feature set 244 for multiple words within the text 108, each corresponding to one or more words within the text 108. In certain implementations, accuracy of the table detection system 110 may be improved if a separate feature set 244 is calculated for each word of the text 108 to improve granularity.

The features included in the feature set 244 may differ depending on the document 102 or the document type. For example, the features may be selected while training the machine learning model 128, as discussed below, to include the features identified as most relevant to the accuracy of machine learning model 128 predictions.

The feature set 244 may be used by the text classifier 126, e.g. analyzed by the machine learning model 128, to estimate the probability that each feature set 244 is a candidate table word 140, 142. These candidate table words 140, 142 may then be used by the table recognizer 132 to recognize a table location, such as a candidate table border 134 of a table 202 of the document 102.

Figure 3:
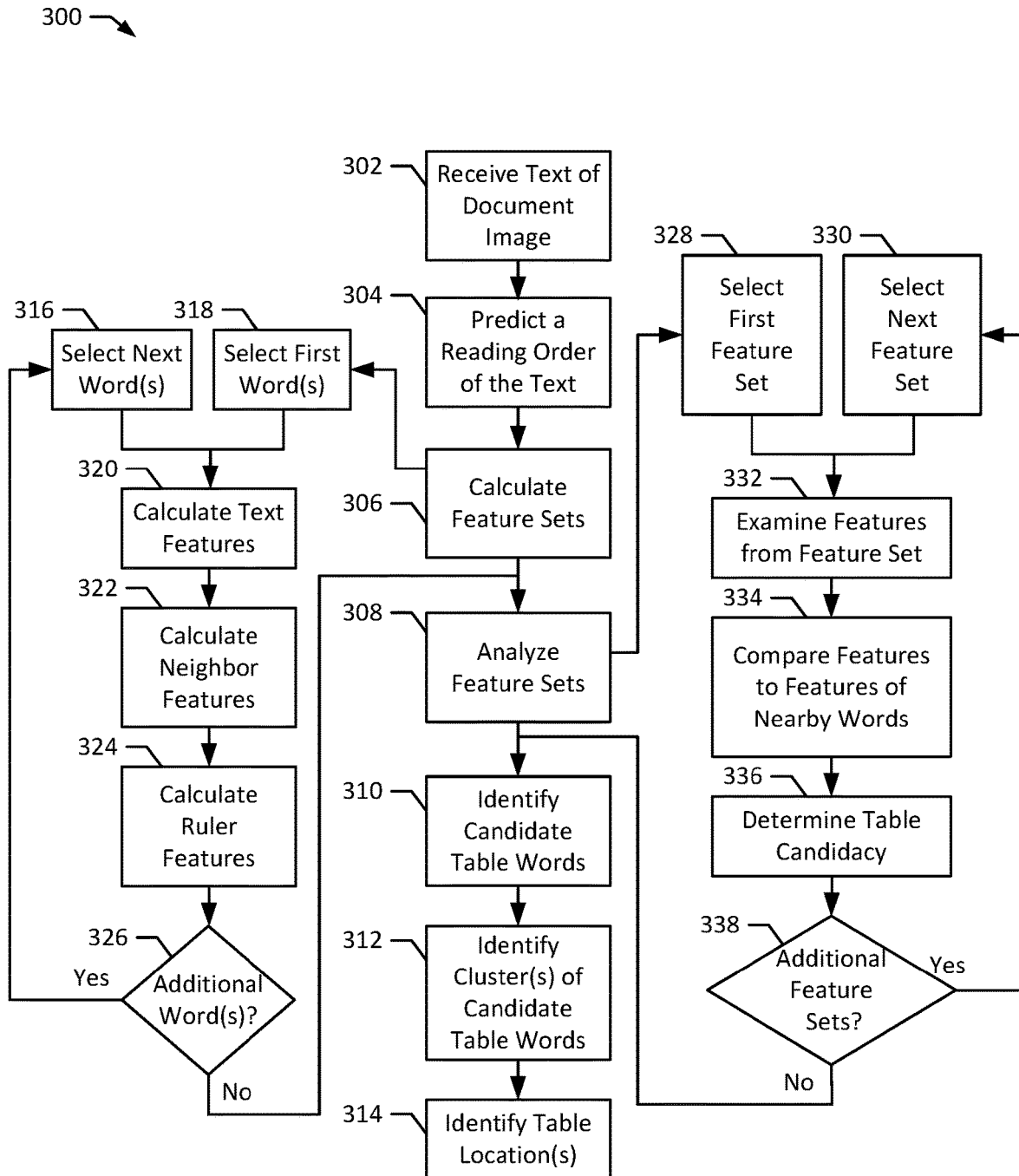
FIG. 3 illustrates a flow chart of a method according to an exemplary embodiment of the present disclosure.

FIG. 3 depicts a flow chart of a method 300 according to an exemplary embodiment of the present disclosure. The method 300, when executed, may be used to predict a reading order 118 of a text 108 of a document 102, generate features vectors 122, 124, 244 for one or more words of the text 108, classify the text 108 to create a classified text 130 containing candidate table words 140, 142, and to use the classified text 130 to identify a table location, such as a candidate table border 134, indicating a location of a table 202 within the document 102. The method 300 may be implemented on a computer system, such as the document intake system 104. For example, one or more steps of the method 300 may be implemented by the table detection system, including the reading order predictor 112, the feature set creator 120, the text classifier 126, and the table recognizer 132. For example, all or part of the method 300 may be implemented by the CPU 136 and the memory 138. Although the examples below are described with reference to the flowchart illustrated in FIG. 3, many other methods of performing the acts associated with FIG. 3 may be used. For example, the order of some of the blocks may be changed, certain blocks may be combined with other blocks, one or more of the blocks may be repeated, and some of the blocks described may be optional.

The method 300 may begin with the document intake system 104 receiving the text 108 of a document 102 (block 302). The document 102 may be associated with a document type that the document intake system 104 is configured to process, as described above. In certain implementations, the text 108 may be omitted and only the document 102 may be received, in which case the optical character recognizer 106 may perform OCR on the document 102 to recognize a text 108 of the document 102.

The table detection system 110 may then proceed to predict a reading order 118 of the text 108 (block 304). The reading order 118 may indicate the predicted order in which the words of the text 108 are read. Predicting the reading order 118 may help ensure that later processing of the text occurs in the proper order (i.e., in the order the words are read by a human reader or in the order that optimizes later processing accuracy by an automated document processing system), which may assist the table detection system 110 in properly understanding the document 102. As described above, the reading order predictor 112 may be configured with more than one reading order prediction procedure, and may use different procedures for different document types. One such reading order prediction procedure may include assigning a second word of the text 108 is coming after a first word of the text 108 if one of the following are true: (i) the second word is below the first word according to the words' vertical coordinates on a page of the document 102, or (ii) the second word is at the same or similar vertical coordinate as the first word, but is positioned to the right of the first word according to the words' horizontal coordinates on a page of the document 102. After detecting the reading order 118, the reading order predictor 112 may assemble a read text 114 that includes both the text 108 and the reading order 118. For example, the read text 114 may rearrange the words of the text 108 such that they occur in the order reflected in the reading order 118 predicted by the reading order predictor 112. Storing and providing the reading order 118 in this way may make for simplified processing later, e.g., by the feature set creator 120 and the text classifier 126.

The table detection system 110 may then proceed to calculate feature sets 122, 124, 244 for words of the text 108 (block 306). As described above, the feature sets 122, 124, 244 may in certain implementations each correspond to a single word of the text 108, but in other implementations may correspond to more than one word of the text 108. In certain implementations, the feature set creator 120 may create feature sets 122, 124, 244 for every word of the text 108, but in other implementations may only calculate feature sets 122, 124, 244 for a subset of the words of the text 108. In creating the feature sets 122, 124, 244, the feature set creator 120 may begin by selecting a first word or words of the text 108 (block 318). This first word may be, e.g., the first word in the reading order 118 on a given page of the document 102. For example, if the document 102 contains multiple pages, the feature set creator 120 may sequentially create feature sets 122, 124, 244 for the words on each page of the document 102 in the order that the pages appear in the document 102. In other implementations, the document intake system 104 and the table detection system 110, including the feature set 120 may be configured to process each page of the document 100 individually.

Next, the feature set creator 120 may calculate the text features for the selected word or words (block 320). The feature set creator 120 may calculate the orthographic properties 246 of the selected word or words, for example, by evaluating whether the selected word or words have certain orthographic features, as discussed above. The feature set creator 120 may calculate syntactic properties 248 of the selected word or words, for example, by looking up an embedding vector from an external embedding vector database or embedding vector provider or calculating the embedding vector internally within the document intake system 104, for example using a large corpora of text (e.g., a corpora of text collected from websites or publications such as Wikipedia). Similarly, the feature set 120 may calculate formatting properties 250 of the selected word or words by, for example, evaluating whether the selected word or words have certain formatting features, such as bolded text, underlined text, italicized text, or text of a larger or smaller font size than is typically used in the document 102 (e.g., than the median font size of the document 102 or of the current page of the document 102).

The feature set creator 120 may then proceed to calculate the neighbor features for the selected word or words, such as the neighbor alignment 254 and the neighbor distance 256 (block 322). The feature set creator 120 may calculate the neighbor alignment 254 by, for example, calculating the relative alignments of the neighboring words along a center axis 210, a left axis 206, and a right axis 208. Alternatively, the feature set creator 120 may only calculate one of these alignments, according to the features determined to be most useful while training the machine learning model 128. The feature set creator 120 may calculate the neighbor distance 256 by measuring the distance (e.g., in pixels, inches, centimeters, or characters) between the selected word or words and their horizontal and vertical neighbors. In certain implementations, as discussed above, the neighbor alignment 254 and the neighbor distance 256 may also include an indication of how these respective alignment and distance measurements compare to the median alignments and distance measurements within the document 102. In such implementations, the feature set creator 120 may first calculate the neighbor alignment 254 and/or the neighbor distance 256 for each word or words of the text 108 and may then calculate a median alignments or distance for the document 102 based on all of the calculated alignment and distance measurements. The feature set creator 120 may then go back to the feature sets 122, 124, 244 for each word or words to calculate and add the comparison to the median alignments and distance measurements for the document 102. In other implementations, the feature set creator 120 may calculate the neighbor alignment 254 and the neighbor distance 256 relative to a fixed number (e.g., a fixed neighbor alignment or fixed neighbor distance). The value of the fixed number may be set, e.g., during a training process, such as training the machine learning model 128. The fixed number may vary depending on document type, font, and layout settings of the document. In other implementations, the comparison to the median alignments and distance measurements may not be included within the feature set 122, 124, 244 itself, but may instead be indirectly determined later in processing, e.g., by the text classifier 126 or the machine learning model 128.

The feature set creator 120 may then proceed to calculate the ruler features (block 324). For example, the feature set creator 120 may calculate the nearby ruler line feature 252 by searching the area around the selected word or words, e.g., the area between the selected word or words and the neighboring words. If ruler lines are detected in one or more directions in the area around the selected word or words, the feature set creator 120 may store an indication of the presence and direction of the ruler lines, e.g., as a one-hot encoded vector as discussed above.

The feature set creator 120 may omit calculation for certain of the above-discussed features 246, 248, 250, 252, 254, 256. In particular, certain features may be more or less advantageous for certain documents. For example, the formatting properties 250 may be less essential to accurately detect tables within documents 102 of certain document types, e.g., accounting statements, where large proportions of the document 102 include tables and therefore have similar formatting, making comparisons to median font size and typical formatting less informative. Similarly, a nearby ruler line feature 252 may be less essential to accurately detect tables within documents 102 of document types where tables do not generally include ruler lines, e.g., financial statements such as income statements. Therefore, in such implementation, to improve processing time, these aspects may be omitted from the calculated features of the feature set 122, 124, 244. Additionally, the features 246, 248, 250, 252, 254, 256 calculated by the feature set creator 120 may be selected during a machine learning model 128 training phase to include those features 246, 248, 250, 252, 254, 256 most important to the machine learning model 128's accurate operation.

The feature set creator 120 may then determine whether there are additional words for which a feature set 122, 124, 244 is required (block 326). For example, the feature set creator 120 may determine whether there are additional words within the text 108, or within the subset of the text 108 for which feature sets 122, 124, 244 are being calculated. If the feature set creator 120 determines that there are additional words, processing may continue by selecting the next word or words within the text 108 for processing (block 316). For example, the feature set creator 120 may select the next word or words in the reading order 118. Further, if the previous word being processed was at the end of a page of the document 102, the feature set creator 120 may select the first word on the following page according to the reading order 118. Alternatively, if the table detection system 110 and/or the document intake system 104 are configured to process each page of the document 102 individually, the feature set creator 120 may determine that there are no additional words for processing if the previously processed word is at the end of a page of the document 102. Once the next word or words are selected, processing may continue through blocks 320, 322, 324 until there are no further words for which feature sets 122, 124, 244 are to be calculated remaining at block 326.

If the feature set creator 120 determines that there are no additional words, the text classifier 126 may then analyze the feature sets 122, 124, 244 (block 308). As described above, the text classifier 126 may analyze the feature sets with the machine learning model 128, which may predict the likelihood that the corresponding word or words are contained within a table 202 of the document 102. In particular, the machine learning model 128 may be configured to analyze each feature set 122, 124, 244 and estimate a probability that each corresponding word is contained within a table 202. In certain implementations, the machine learning model 128 may be trained to find patterns within feature sets corresponding to localized regions of words within the document 102. For example, the machine learning model 128 may be configured to analyze each feature set in connection with the feature sets of neighboring words to estimate the likelihood that the corresponding word is contained within a table 202. In still further implementations, the machine learning model 128 may be configured to analyze all of the feature sets 122, 124, 244 at the same time to identify broader spatial patterns within the document 102. In such implementations, it may be helpful to break the document 102 up by individual pages (or smaller groups of pages) and analyze each individually, to limit the associated processing requirements. The machine learning model 128 may accordingly incorporate additional spatial information beyond what is specifically calculated in the feature set 122, 124, 244. For instance, even if a feature set 122, 124, 244 does not expressly include nearby words to the cell being analyzed, a machine learning model 128 may be configured to analyze surrounding cells may determine and incorporate that information from the surrounding cells themselves. In certain implementations, the machine learning model 128 may be a recurrent neural network configured to analyze cell regions of the document 102. However, other machine learning model 128 implementations are possible, including a convolutional neural network. In such implementations, the features most important to the successful operation of the machine learning model 128 may include the neighbor alignment 254, the neighbor distance 256, and the orthographic features 246.

As described in greater detail below, the machine learning model 128 may be trained to detect certain kinds of tables, and may be trained to analyze documents 102 of a specific document type. For example, one machine learning model 128 may be trained to analyze legal documents or specific types of legal documents (e.g., leases or purchasing agreements) and another machine learning model 128 may be configured to analyze financial documents or a certain type of financial document (e.g., invoice values, accounting documents). For this reason, although only depicted in the singular, the text classifier 126 may include more than one machine learning model 128 and may use the machine learning models 128 to analyze certain documents or to detect specific kinds of tables.

In analyzing the feature sets 122, 124, 244, the text classifier 126 may first select a first feature set 122, 124, 244 (block 328). For example, the text classifier 126 may select the feature set 122, 124, 244 corresponding to the first word or words of the document 102, or the first word or words of the current page being processed from the document 102. The text classifier 126 may then examine the features from the selected feature set 122, 124, 244 (block 332). For example, the machine learning model 128 may analyze the text features 246, 248, 250 and the spatial features 252, 254, 256 of the feature set 122, 124, 244. In analyzing the feature set 122, 124, 244, the machine learning model 128 may identify one or more characteristics that increase the likelihood that the corresponding text 242 to the selected feature set 122, 124, 244 is included within a table 202. For example, as discussed above, certain orthographic features within the orthographic properties 246 of the corresponding text 242 may indicate a greater likelihood that the corresponding text 242 is included within a table 202 (e.g., financial symbols, numbers, dollar amounts, and dates in numerical format). Similarly, certain formatting features within the formatting properties 250 may indicate a greater likelihood that the corresponding text 242 is included within a table 202 (e.g., bolded text, underlined text, italicized text, differing font sizes). Further, certain spatial features, such as highly consistent neighbor alignment 254, nearby ruler lines in one or more directions 252, and consistent neighbor distance 256 may further indicate a greater likelihood that the corresponding text 242 is included within a table 202.

The machine learning model 128 may also compare the features in the selected feature set 122, 124, 244 to the features within feature sets 122, 124, 244 corresponding to nearby words (block 334). For example, although a combination of features within the selected feature set 122, 124, 244 may indicate a certain likelihood that the corresponding text 242 is included within a table 202, similar features reflected in feature sets 122, 124, 244 corresponding to nearby words may indicate an even stronger likelihood that the corresponding text 242 of the selected feature set 122, 124, 244 is included within a table 202. For example, words that are included within a table 202 may often occur near one another, and may tend to have consistent text features 246, 248, 250 (e.g., numerical characters, font sizes, and related word syntax) and spatial features 252, 254, 256 (e.g., presence of surrounding ruler lines, alignment with one another, and consistent distance between one another). Accordingly, such shared features between nearby words and the corresponding text 242 may provide a strong indication that these words are included within a table 202.

Based on the preceding analysis, the machine learning model 128 may then determine a table candidacy for the corresponding text 242 (block 336). The table candidacy determination may include, e.g., a predicted likelihood that the corresponding text 242 is included within a table 202 of the document 102.

The text classifier 126 and machine learning model 128 may omit the analysis performed at certain of the above-discussed blocks 332, 334, 336. For example, in certain implementations, the machine learning model 128 may not expressly compare the features of the selected feature set 122, 124, 244 with those of nearby words at block 334, e.g., because such features are not informative for tables contained within certain document types, or because such features may be adequately reflected within certain spatial features, such as the neighbor alignment 250 for the neighbor distance 256. Accordingly, to reduce processing time and demands, such analysis may be omitted.

The text classifier 126 and/or the machine learning model 128 may then determine whether there are additional feature sets for analysis (block 338). For example, the text classifier 126 may determine whether there are feature sets 122, 124, 244 corresponding to additional words within the text 108, or within the subset of the text 108 for which feature sets 122, 124, 244 were calculated. If there are additional feature sets 122, 124, 244 for analysis, the text classifier 126 and/or the machine learning model 128 may select the next feature set 122, 124, 244 for analysis (block 330). For example, the next feature set 122, 124, 244 may be the feature set 122, 124, 244 corresponding to the next word in the reading order 118. Once the next feature set 122, 124, 244 is selected, processing may continue through blocks 332, 334, 336 until there are no additional feature sets 122, 124, 244 remaining at block 338.

When no additional feature sets 122, 124, 244 remain for analysis, the text classifier 126 may then identify the candidate table words 140, 142 (block 310). As discussed above, the candidate table words 140, 142 may be selected as those words within the text 108 with a predicted likelihood of being within a table 202 that exceeds a certain threshold. For example, the candidate table words 140, 142 may include all words with a predicted likelihood greater than 50% or 75% of being contained within a table 202. The text classifier 126 may also create a classified text 130 that includes an indication of those words within the text 108 that or identified as candidate table words 140, 142. In certain implementations, the candidate table words 140, 142 may be identified using a one-hot encoding, such as a Boolean indicator corresponding to candidate table word status. In other implementations, the indication may include only the predicted likelihood from the machine learning model 128 that the words are included within a table 202.

The table recognizer 132 may then identify a cluster or clusters of candidate table words 140, 142 (block 312). In identifying clusters of candidate table words 140, 142, the table recognizer 132 may utilize both the table candidacy determination generated by the text classifier 126 and the location information concerning the candidate table words 140, 142. For example, the clusters may be identified as including all candidate table words that are located near one another, and in order to identify which candidate table words are near one another, location information regarding the candidate table words may be necessary. Additionally, certain documents 102 or document types may generally only include one table per page. In implementations concerning such documents 102 or document types, the table recognizer 132 may be configured to attempt to identify only a single cluster of candidate table words 140, 142 per page. However, other documents 102 or document types may occasionally have more than one table on certain pages. Accordingly, implementations processing these types of documents 102 may be configured to potentially identify more than one cluster per page of the document 102. For these reasons, the table recognizer 132 may include more than one cluster identification procedure. However, certain implementations may be adequately served by a single procedure, such as a density-based clustering method (e.g., DBSCAN). In still further implementations, the clusters may be identified by a second machine learning model, trained to identify clusters of candidate table words in documents of one or more document types (e.g., a machine learning model trained to co-reference the predictions of the text classifier 126, such as a convolutional or attention machine learning model). The table recognizer 132 may then identify the location or locations of the table or tables 202 within the document 102 (block 314). In certain implementations, the table recognizer 132 may be configured to identify a candidate table border 134 for each table 202. For example, for each cluster of candidate table words 140, 142 identified by the table recognizer at block 312, the table recognizer 132 may recognize a separate candidate table border 134, e.g., because each cluster of candidate table words 140, 142 may correspond to a single table within the document 102. Accordingly, the table recognizer 132 may recognize a candidate table border 134 as the smallest rectangular border that encloses each of the candidate table words 140, 142 within a cluster. In practice, identifying the candidate table border 134 in this way may include additional words from the text 108 that have not been expressly identified as candidate table words 140, 142. For example, it may be common in certain implementations for the first and final words of a table 202 to be incorrectly excluded as candidate table words 140, 142. However, it may also be typical in such examples for other words of the table 202 (e.g., words in the same row and/or column as the first and final words) to be accurately identified as candidate table words 140, 142. Therefore, these words are likely to be included in a cluster of candidate table words 140, 142 and identifying the table location as the candidate table border 134 discussed above will still include the first and final words by virtue of the cluster including candidate table words 140, 142 in the same row and/or column. In this way, the table recognizer 132 may be able to account for and adapt to errors by the machine learning model 128. Once the table location has been accurately identified, processing may continue on the document 102, for example to analyze the content of the document 102 by an automated document processing system.

All or some of the blocks of the method 300 may be optional. For example, the method 300 may be performed without executing one or more of blocks 316, 318, 320, 322, 324, 326 in connection with creating the feature sets 122, 124, 244 at block 306. Instead, processing at block 404 may continue directly to analyzing the feature sets at block 308. Similarly, the analysis at block 308 need not necessarily be performed by executing one or more of blocks 328, 330, 332, 334, 336, 338. Rather, processing from block 308 may proceed directly to identifying the candidate table words 140, 142 at block 310.

Figure 4A:
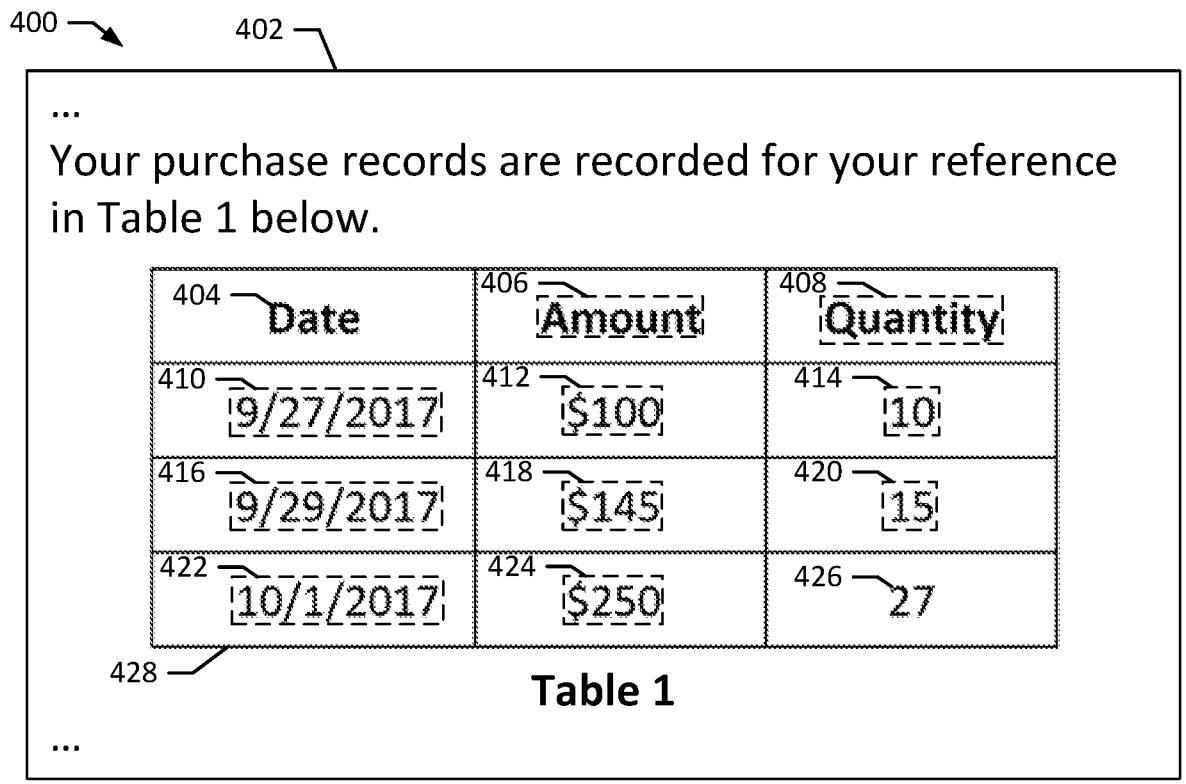
FIGS. 4A and 4B illustrate an example named entity recognition procedure according to an example embodiment of the present disclosure.
Figure 4B:
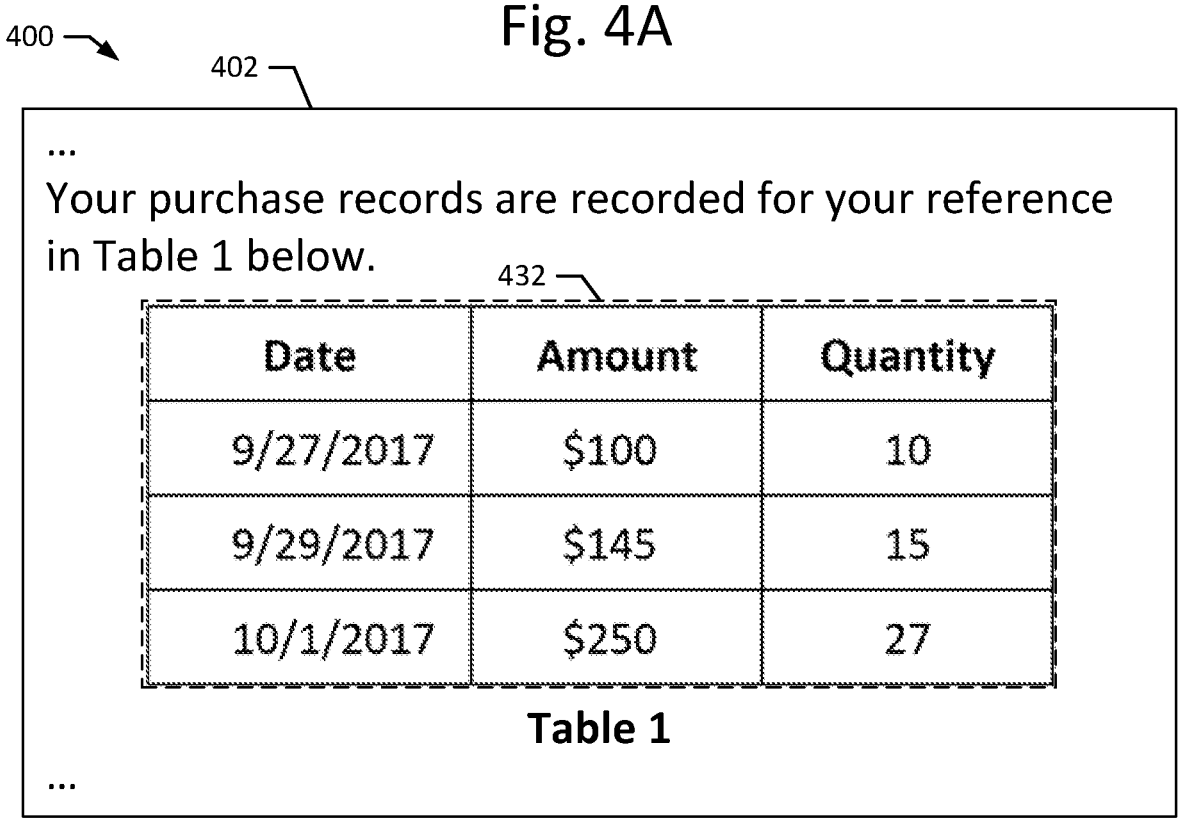

FIGS. 4A and 4B depict an example named entity recognition procedure 400 according to an example embodiment of the present disclosure. In some implementations, the procedure 400 may be performed according to a method for predicting a reading order 118 of a text 108 of a document 102, generating features vectors 122, 124, 244 for one or more words of the text 108, classifying the text 108 to create a classified text 130 containing candidate table words 140, 142, and using the classified text 130 to identify a candidate table border 134 indicating an estimated location of a table 202 within the document 102, such as the method 300. As described in greater detail below, the steps performed in conjunction with the procedure 400 may be performed by the document intake system 104, the table detection system 110, the reading order predictor 112, the feature set creator 120, the text classifier 126, and/or the table recognizer 132.

The procedure 400 may begin in FIG. 4A with the document 402. Although similar steps may be used to analyze a document for a page of a document in its entirety, the document 402 depicted only includes a portion of a page for clarity in presentation. As can be seen, the depicted portion of the document 402 includes a text portion, reciting, "Your purchase records are recorded for your reference in Table 1 below." The document 402 also includes a table 428 including multiple words 404-426. Below the table 428 is a second text portion reciting, "Table 1." In certain implementations, a text 108 of the document 402 may be recognized by the optical character recognizer 106 as discussed above. Additionally, further accurate processing of the contents of the document 402 (e.g., processing the contents of the table 428) may depend on accurate detection of the table 428 within the document 402.

To accurately detect the table 428, the table detection system 110 may first predict a reading order 118 for the text 108 of the document 402. As discussed above, the reading order predictor 112 may use one of several reading order prediction procedures, including assigning a second word as coming after a first word of the text 108 if either (i) the second word is below the first word according to the words' vertical coordinates on a page of the document 402 (e.g., "Table 1" is below "recorded") or (ii) the second word is both at the same or similar vertical coordinates as the first word, but is positioned to the right of the first word according to the words' horizontal coordinate on a page of the document 402 (e.g., "recorded" is at the same vertical coordinate as "purchase," but is located to the right). In the two preceding examples, "Table 1" may be assigned as after the word "recorded," which is itself assigned after the word "purchase" in the reading order 118. As another example, word 408 may be assigned after word 406 according to condition (ii) above, and word 412 may be assigned after word 408 in the reading order 118 according to condition (i) above. The reading order predictor 112 may proceed in this way until all words within the text 108 of the document 402 are assigned as coming either before or after the other words of the text 108.

Once the reading order 118 is predicted, the feature set creator 120 may create feature sets 122, 124, 244 for one or more words of the text 108. For example, the feature set creator 120 may create feature sets 122, 124, 244 for each of the words of the text 108. The feature sets 122, 124, 244 may include one or more text or spatial features of the corresponding text 242, as discussed above. The machine learning model 128 of the text classifier 126 may then analyze these feature sets 122, 124, 244 to determine whether the words of the text 108 are candidate table words. In the example depicted in FIG. 4A, the words identified as candidate table words are indicated with a dashed outline. Accordingly, as depicted, words 406-424 are identified by the machine learning model 128 as candidate table words.

In identifying the candidate table words 406-424, the machine learning model 128 may analyze one or more features of the corresponding feature sets 122, 124, 244. For example, word 418 recites "$145." Accordingly, the orthographic properties 246 of word 418 may indicate the presence of a financial symbol "$," along with numerical figures "145." The presence of these figures may indicate that the word 418 is likely to be included within a table 428. Additionally, spatial features, such as a nearby ruler line feature 252 may indicate that there are ruler lines above, below, to the left, and to the right of the word 418 (e.g., a one-hot encoded vector of (1, 1, 1, 1)). As discussed above, these nearby ruler lines may provide a strong indication that the word 418 is included within a table. By contrast, ruler lines in only one direction may not be a strong indication, as ruler lines only above or below the corresponding text 242 may, for example, instead indicate that the corresponding text 242 is, respectively, a caption or title of the table 202, as with the text "Table 1" below the table 202. Additionally, the neighbor alignment 254 may indicate a strong center alignment with the above and below neighbors 412, 424 of the word 418. The neighbor distance 256 may also indicate a strong consistency of distance between the word 418 and its neighbors to the left and right. For example, the distance 222 between the word 418 and its left neighbor 416 as defined in FIG. 2A is very similar to the distances 220, 224 between neighboring words 412, 424 and their respective left neighbors 410, 422. Likewise, the distances 228, 226, 230 between the words 418, 412, 424 and their right neighbors 420, 414, 426 are very similar. The strong similarity between the neighbor distances 256 may also provide a strong indication that the word 418 is contained within a table 428. A similar analysis may be performed on words 412, 424 in the same column.

Other useful features may include a right alignment measurement within the neighbor alignment 254 and formatting properties 250. For example, the words 410, 416, 422 are right aligned with one another. Accordingly, the neighbor alignment 254 for the word 416 may include an indication that these words are right aligned, which may also indicate that these words are co-located within a column, and therefore likely included within a table 428. Further, the formatting properties 250 and/or the orthographic properties 246 may indicate that these words 410, 416, 422 are dates that are formatted numerically. This usage may be typical in tables, and may be uncommon within text portions of certain documents types. Accordingly, this formatting information may increase the likelihood that the words 410, 416, 422 are located within a table 428. Further, the words 404, 406, 408 are formatted with bolded text, which may be indicated in the formatting properties 250 of their corresponding feature sets 122, 124, 244. Bolded text may suggest that the text is a header within tables of certain document types, as is the case in the table 428, and may therefore increase the likelihood that the words 404, 406, 408 are contained within a table 428. Similar reasoning may apply to text that is italicized or underlined for tables in certain types of documents. Based on these characteristics, and other potential characteristics, the machine learning model 128 may determine that the words 406-424 are candidate table words. In certain instances, depending on the accuracy of the machine learning model 128, the words 404, 426 on the first and final corners of the table, as read from left to right, may be incorrectly classified as non-table words. Such an error may occur because, e.g., the word 404 comes at the beginning of the reading order 118 in the table 428, and the word 426 comes at the end of the reading order 118 for the table 428. Additionally, because the words 404, 426 are at the corners of the table, the words 404, 426 are not surrounded as many table words as other words in the table (e.g., the word 412 has table words 406, 410, 414, 418 in all four directions). Therefore, although these words 404, 426 include other indications of table candidacy, the machine learning model 128 may incorrectly characterize them. After identifying the candidate table words 406-424, the table recognizer 132 may identify a table location, signified by the candidate table border 432 reflected in FIG. 4B. In identifying the table location, the table recognizer 132 may define the candidate table border 432 using one of a number of strategies. As depicted, the candidate table border 432 may be defined as the rectangle with the smallest area that encloses all of the candidate table words 406-424. By defining the candidate table border 432 in this way, the table recognizer 132 accurately include the words 404, 426 within the candidate table border 432, even though these words 404, 426 were not identified as the candidate table words 406-424. Other table location identification procedures may be used, as discussed above.

By following the above-described procedure, the table detection system 110 can accurately identify a candidate table border 432 corresponding to the table 428 within the document 402, without including unnecessary text. Accordingly, after the table 428 has been accurately detected, the document 402 may be forwarded for additional processing by an automated document processing system.

FIG. 5 depicts a flow diagram of an example method 500 according to an example embodiment of the present disclosure. The flow diagram includes a training system 502, a feature set creator 504, a text classifier model 506, and a table recognizer 508. The training system 502 may be configured to orchestrate the operation of the method 500 and generate updated model parameters based on the outputs generated during the training, as detailed below. In some implementations, the training system 502 may be implemented as part of a table detection system 110 or a text classifier 126. The feature set creator 504 may be implemented as the feature set creator 120 and may be configured to create feature sets 122, 124, 244 based on a document 102, 402. The text classifier model 506 may be implemented as the machine learning model 128 of the text classifier 126 and may be configured to analyze feature sets 122, 124, 244 to text and identify the location of one or more tables 202, 428 within the document 102, 402. The table recognizer 508 may be implemented as the table recognizer 132 and may be configured to identify a table location, such as a candidate table border 134, 432 for tables 202, 428 located within a document 102, 402.

The method 500 may be used to train the text classifier model 506, which may be associated with the text classifier 126. Training the text classifier model 506 may improve the accuracy of the text classifier model 506 at detecting the location of one or more tables within the document 102, 402. Alternatively, training the text classifier model 506 may allow the text classifier model 506 to detect and identify the location of new tables 202, 428, such as tables 202, 428 with new types of formatting, or new information contained within the tables 202, 428. For example, the text classifier model 506 may be initially trained to detect tables 202, 428 in accounting documents (e.g., income statements) and, after completing the method 500, the text classifier model 506 may be able to recognize tables 202, 428 in financial documents (e.g., 10-K filings). In another example, the text classifier model 506 may be initially trained to detect tables 202, 408 containing numerical content (e.g., accounting/financial documents) and, after completing the method 500, the text classifier model 506 may be able to recognize tables containing written content (e.g., contact information provided in leases or other agreements). In some implementations, the method 500 may be performed more than once to train the text classifier model 506. In other implementations, the method 500 may only need to be performed once in order to properly train the text classifier model 506. A machine learning operator, such as an automated document processing system developer, may determine the number of times the method 500 is performed. Alternatively a training system 502 may determine the number of times the method 500 is performed. For example, the training system 502 may repeat the method 500 until the text classifier model 506 is able to detect tables 202, 428 in a new document type or detect new types of tables 202, 428 with a particular level of accuracy.

The method 500 may be implemented on a computer system, such as the document intake system 104. For example, one or more steps of the method 500 may be implemented by the table detection system 110, including the reading order predictor 112, the feature set creator 120, the text classifier 126, and the table recognizer 132. The method 500 may also be implemented by a set of instructions stored on a computer readable medium that, when executed by a processor, cause the computer system to perform the method. For example, all or part of the method 500 may be implemented by the CPU 136 and the memory 138. Although the examples below are described with reference to the flowchart illustrated in FIG. 5, many other methods of performing the acts associated with FIG. 5 may be used. For example, the order of some of the blocks may be changed, certain blocks may be combined with other blocks, one or more of the blocks may be repeated, and some of the blocks described may be optional.

Additionally, FIG. 5 depicts multiple communications between the training system 502, the feature set creator 504, the text classifier model 506, and the table recognizer 508. These communications may be transmissions between multiple pieces of hardware or may be exchanges between different programmatic modules of software. For example, the communications may be transmissions over a network between multiple computing systems, such as over the Internet or a local networking connection. These transmissions may occur over a wired or wireless interface. Other communications may be exchanges between software modules, performed through an application programming interface (API), or other established communication protocols.

The method 500 may begin with the training system 502 creating or selecting a training document and a training text (block 510). The training system 502 may create the training text by using an optical character recognizer 106 to extract text from a document 102, 402. Alternatively, the training system 502 may be connected to or contain a memory that stores training texts and may select one of the training texts for use in training the text classifier model 506. The training system 502 may create the training text based on the purpose for training the text classifier model 506. For example, if the text classifier model 506 is being trained to process a new document type, the training system 502 may create the training text to include text originating from or similar to the new document type. In another example, if the text classifier model 506 is being trained to improve its accuracy, the training system 502 may create a training text that includes particularly difficult table layouts. In a still further example, if the text classifier model 506 is being trained to identify a new table layout, the training system 502 may create a training text that includes a table or tables with the new table layout.

The feature set creator 504 may then create a training feature sets based on the training text (block 512). As with the feature sets 122, 124, 244 discussed above, the feature sets may be created based on a corresponding word or words of the training text and may include one or more text features are spatial features, including orthographic properties 246, syntactic properties 248, formatting properties 250, a nearby ruler line feature 252, neighbor alignment 254, and neighbor distance 256. In certain implementations, rather than creating the training feature set the feature set creator 504, the training system 502 may provide a training feature set based on the training document and training text created or selected at block 510.

The text classifier model 506 may analyze the training feature map, the training text, and/or the training document (block 514) and identify candidate training table words in the training document into training text (block 516). As discussed above, the text classifier model 506 may analyze the training feature sets to identify candidate table words that are likely to be located within a training table of the training text. For example, the text classifier model 506 may analyze one or more features within the training feature sets for features suggesting presence within a training table of the training document. For example, the text classifier model 506 may analyze the text features for indications of certain formatting or orthographic properties 246, 250 (e.g., bolded text, numerical text) indicative of the corresponding word or words of the training text being located within a training table of the training document. In addition, the text classifier model 506 may analyze spatial features for indications of certain spatial information (e.g., consistent neighbor alignment and/or distance, nearby ruler lines in one or more directions) indicative of the corresponding word or words of the training text being contained within a training table of the training document. As discussed in examples above, the text classifier model 506 may analyze the training feature sets corresponding to words located near one another within the training document to more accurately identify candidate training table words, as training table words may occur near one another within the training document. In identifying the candidate training table words, the text classifier model 506 may estimate a probability that each word of the training text is contained within a table, and may include that estimation within a classified text for each of the analyzed words of the training text. The text classifier model 506, or a related text classifier 126, may identify the candidate training table words as those words of the training text that had an estimated probability of being contained within a table that exceeds a given threshold. This threshold may differ based on document type, and may be adjusted during the training process according to the method 500 in order to increase the text classifier model 506's accuracy at identify candidate training table words within documents of a similar document type. The text classifier model 506 or text classifier 126 may indicate the candidate training table words in a classified training text, similar to the classified text 130 discussed above.

The table recognizer 508 may receive the candidate training table words (block 608). For example, the table recognizer 508 may receive the classified training text, including the estimated probabilities for each of the analyzed words of the training text, which may also further include a specific indicator (e.g., a Boolean indicator) of which words were identified as candidate training table words. Alternatively, the table recognizer 508 may only receive an indication of the words identified as candidate training table words.

The table recognizer 508 may then estimate the training table location based on the received candidate training table words (block 520). As discussed above, the table recognizer 508 may estimate the training table location using one or more table location estimation procedures, which may include identifying the rectangle with the smallest area that encloses all of the candidate training table words. In certain implementations, the table recognizer 508 may estimate the training table location as a candidate training table border of the training table. The training system 502 may then receive the training table location (block 522). For example, the training system 502 may receive the estimated candidate training table border of the training table generated at block 520 by the table recognizer 508. The training system 502 may then compare the estimated training table location with a labeled table location generated by the training system 502, indicating the actual desired table location (e.g., the actual table border for the training table) for identification by the table recognizer 508 (block 524). The training system 502 may identify one or more errors in the training table location. For example, the estimated training table location may exclude one or more words that should be included within the estimated table location according to the labeled table location. Alternatively, the estimated training table location may include words that should not be included within the estimated candidate training table border. Further, the estimated training table location may include all of the desired words for inclusion within the training table, but may be larger than necessary (e.g., the candidate training table border for the estimated table location may not be the smallest possible rectangle). Prior to estimating the table location and/or the candidate training table border, the table recognizer 508 may analyze the received candidate training table words to identify a cluster or clusters of candidate training table words, where each cluster corresponds to candidate training table words likely originating from the same training table within the training document.

After identifying these errors in the estimated training table location, the training system 502 may generate updated model parameters (block 526). The updated model parameters may be generated to improve the accuracy of the text classifier model 506 by, for example, improving the accuracy of the text classifier model 506 at estimating the training table location within a document based on the feature sets, or by improving the accuracy of the table recognizer 508 at estimating the training table location based on the received candidate training table words from the text classifier model. The updated model parameters may be generated by, for example, adjusting the weights assigned to particular features included in the training feature sets, or by adjusting whether and to what extent the text classifier model 506 analyzes feature sets for nearby words, rather than just for each word individually. For example, if the text classifier model 506 is being trained to identify tables in which ruler lines are uncommon, the text classifier model 506 may be updated with parameters that deemphasize the importance of the nearby ruler line property 252. In this example, the feature set creator 504 may also be updated to no longer calculate a nearby ruler line feature 252 for inclusion within the training feature sets at block 512. The updated model parameters may also be generated by, for example, altering the strategy by which the table recognizer 508 estimates a candidate training table border, or identifies one or more clusters of the candidate training table words. For example, if the method 500 is being performed to improve accuracy at estimating the location of tables within a document type that frequently contains more than one table per page, the table recognizer 508 may be updated with a different cluster identification method that is better able to identify more than one cluster of candidate training table words within a single page. Additionally, the updated model parameters may include an adjustment of the threshold used by the text classifier model 506 to identify candidate training table words based on the estimated probability of location within a training table.

The feature set creator 504, text classifier model 506, and table recognizer 508 may then receive the updated model parameters and be updated to incorporate the updated model parameters (block 538). The method 500 may then repeat again beginning at block 510 to further train the model as discussed above. Similarly, blocks 510-528 may be repeated in whole or in part, e.g., based on multiple training documents and training texts, before generating updated model parameters at block 526.

All of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method, comprising:
    receiving a text of a document image that includes a plurality of words depicted in the document image;
    calculating a plurality of feature sets for the plurality of words, wherein each feature set contains information indicative of one or more features of a corresponding word of the plurality of words;
    identifying candidate table words among the plurality of words based on the feature sets using a machine learning model;
    identifying, with a clustering procedure, a cluster of candidate table words that correspond to a table within the document image; and
    defining a candidate table border of the table that encompasses the cluster of candidate table words and one or more words of the text that are not candidate table words,
    wherein the candidate table words include at least one word that is a table header and at least one word that is not a table header.

2. The method of claim 1, wherein the features of the feature set include one or more text features selected from the group consisting of: orthographic properties of the corresponding word, syntactic properties of the corresponding word, and formatting properties of the corresponding word.

3. The method of claim 1, wherein the features of the feature set include one or more spatial features selected from the group consisting of: a nearby ruler line distance, a neighbor alignment measurement, and a neighbor distance measurement.

4. The method of claim 1, wherein the candidate table border is defined as the rectangle with the smallest area that contains the cluster of candidate table words.

5. The method of claim 1, wherein the clustering procedure is a density-based spatial clustering of applications with noise (DB SCAN) procedure.

6. The method of claim 1, further comprising:
    predicting a reading order for at least a subset of the words of the text.

7. The method of claim 6, wherein the text further includes a location for the subset of words, and wherein predicting the reading order further comprises:
    assigning a first word of the subset of words as coming before a second word of the subset of words in the reading order if one or more of the following conditions are true: (i) the second word is below the first word according to the location of the first and second words, or (ii) the second word is at the same height as the first word and is positioned to the right of the first word according to the location.

8. The method of claim 1, wherein the machine learning model is a recurrent neural network or a convolutional neural network.

9. The method of claim 1, further comprising:
    receiving a training text of a training document, including a plurality of words depicted in the training document and a labeled document image indicating a labeled table location of a table within the training document;
    calculating a plurality of training feature sets for the words of the training text, wherein each training feature set contains information indicative of one or more features of a corresponding word of the plurality of words of the training text;
    identifying, with the machine learning model, candidate training table words of the training text among the words of the training text based on the training feature sets;
    identifying, with the clustering procedure, a cluster of candidate training table words that correspond to a table within the document image;
    defining a candidate training table location including a candidate training table border of the training table that contains the cluster of candidate training table words;
    comparing the training table location with the labeled table location to identify a table location error of the training table location; and
    updating one or more parameters of the machine learning model based on the table location error.

10. A system comprising:
    a processor; and
    a memory containing instructions that, when executed by the processor, cause the processor to:
        receive a text of a document image that includes a plurality of words depicted in the document image;
        calculate a plurality of feature sets for the words, wherein each feature set contains information indicative of one or more features of a corresponding word of the plurality of words;
        identify candidate table words among the plurality of words based on the feature sets using a machine learning model;
        identify, with a clustering procedure, a cluster of candidate table words that correspond to a table within the document image; and define a candidate table border of the table that encompasses the cluster of candidate table words and one or more words of the text that are not candidate table words, wherein the candidate table words include at least one word that is a table header and at least one word that is not a table header.

11. The system of claim 10, wherein the features of the feature set include one or more text features selected from the group consisting of: orthographic properties of the corresponding word, syntactic properties of the corresponding word, and formatting properties of the corresponding word.

12. The system of claim 10, wherein the features of the feature set include one or more spatial features selected from the group consisting of: a nearby ruler line distance, a neighbor alignment measurement, and a neighbor distance measurement.

13. The system of claim 10, wherein the candidate table border is defined as the rectangle with the smallest area that contains the cluster of candidate table words.

14. The system of claim 10, wherein the memory contains further instructions which, when executed by the processor, cause the processor to:

predict a reading order for at least a subset of the words of the text.

15. The system of claim 14, wherein the text further includes a location for the subset of words, and wherein the memory contains further instructions which, when executed by the processor, cause the processor to:

assign a first word of the subset of words as coming before a second word of the subset of words in the reading order if one or more of the following conditions are true: (i) the second word is below the first word according to the location of the first and second words, or (ii) the second word is at the same height as the first word and is positioned to the right of the first word according to the location.

16. The system of claim 10, wherein the machine learning model including at least one of a recurrent neural network and a convolutional neural network.

17. The system of claim 16, further comprising a training system configured, when executed by the processor, to:

receive a training text of a training document, including a plurality of words depicted in the training document and a labeled document image indicating a labeled table location of a table within the training document;

calculate a plurality of training feature sets for the words of the training text, wherein each training feature set contains one or more features of a corresponding word of the plurality of words of the training text;

identify, with the machine learning model, candidate training table words of the training text among the words of the training text;

identify, with the clustering procedure, a cluster of candidate training table words that correspond to a table within the document image;

define a candidate training table location including a candidate training table border of the training table that contains the cluster of candidate training table words;

compare the training table location with the labeled table location to identify a table location error of the training table location; and update one or more parameters of the machine learning model based on the table location error.

18. A non-transitory computer-readable medium containing instructions which, when executed by a processor, cause the processor to:

receive a text of a document image that includes a plurality of words depicted in the document image;

calculate a plurality of feature sets for the words, wherein each feature set contains information indicative of one or more features of a corresponding word of the plurality of words;

identify candidate table words among the plurality of words based on the feature sets using a machine learning model;

identify, with a clustering procedure, a cluster of candidate table words that correspond to a table within the document image; and define a candidate table border of the table that encompasses the cluster of candidate table words and one or more words of the text that are not candidate table words, wherein the candidate table words include at least one word that is a table header and at least one word that is not a table header.

19. A method of training a machine learning model for the identification of tables in documents, comprising:

receiving a training text of a training document, including a plurality of words depicted in the training document and a labeled document image indicating a labeled table location of a table within the training document;

calculating a plurality of training feature sets for the words of the training text, wherein each training feature set contains information indicative of one or more features of a corresponding word of the plurality of words of the training text;

identifying, with a machine learning model, candidate training table words of the training text among the words of the training text based on the training feature sets;

identifying, with a clustering procedure, a cluster of candidate training table words that correspond to a table within the document image;

defining a candidate training table location including a candidate training table border of the training table that contains the cluster of candidate training table words;

comparing the training table location with the labeled table location to identify a table location error of the training table location; and updating one or more parameters of the machine learning model based on the table location error.

20. A system for training a machine learning model for the identification of tables in documents, comprising:

a processor; and a memory containing instructions that, when executed by the processor, cause the processor to:

receive a training text of a training document, including a plurality of words depicted in the training document and a labeled document image indicating a labeled table location of a table within the training document;

calculate a plurality of training feature sets for the words of the training text, wherein each training feature set contains one or more features of a corresponding word of the plurality of words of the training text;

identify, with the machine learning model, candidate training table words of the training text among the words of the training text;

identify, with the clustering procedure, a cluster of candidate training table words that correspond to a table within the document image;

define a candidate training table location including a candidate training table border of the training table that contains the cluster of candidate training table words;

compare the training table location with the labeled table location to identify a table location error of the training table location; and update one or more parameters of the machine learning model based on the table location error.

* * * * *